May 26, 1959 G. K. O'CONNOR 2,887,797
SCRAPER BLADE FOR ROAD GRADERS
Filed Jan. 22, 1957
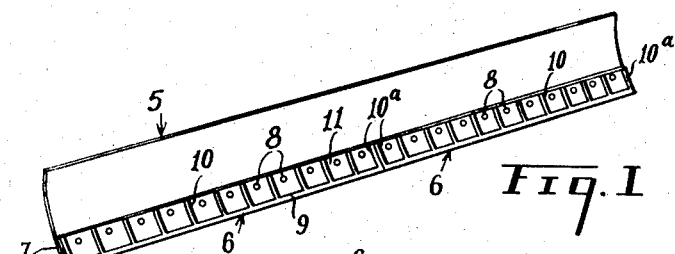
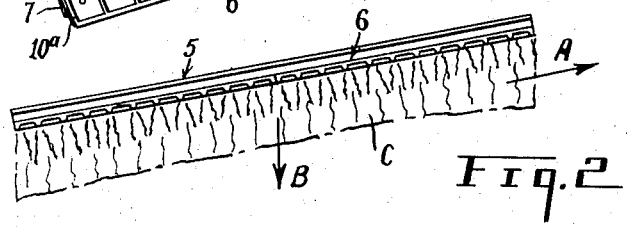
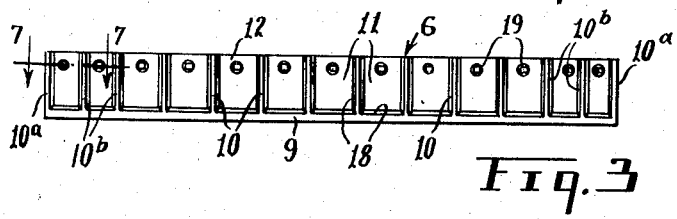
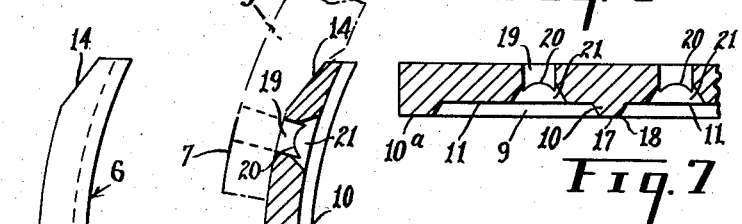
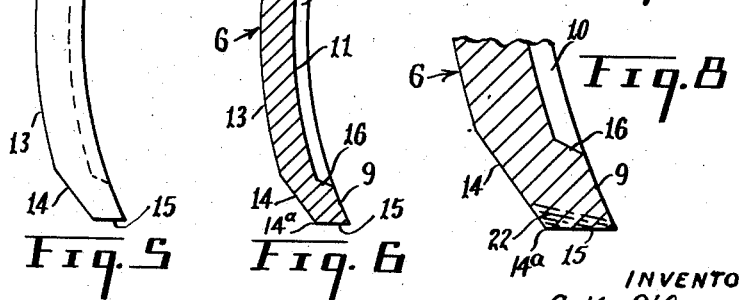
INVENTOR
G. K. O'CONNOR
By Fetherstonhaugh & Co.
Attorneys

United States Patent Office 2,887,797
Patented May 26, 1959

2,887,797
SCRAPER BLADE FOR ROAD GRADERS

George Kevin O'Connor, Montreal, Quebec, Canada

Application January 22, 1957, Serial No. 635,300

8 Claims. (Cl. 37—143)

This invention relates to scraper blades for road graders and like machines and more particularly to the blades forming the working or cutting edge of the mould boards of road graders.

The invention consists essentially in providing a cast blade for attachment to the lower edge of grader mould boards, the cast blade having a continuous rib along its lower horizontal forward or cutting edge and a series of vertical ribs at relatively close intervals extending from the lower horizontal rib to the upper edge of the blade, the horizontal and vertical ribs forming together a multiplicity of cutting edges for the purpose of breaking up solid lumps of gravel, clay etc. The blades are preferably cast of manganese or similar work hardening alloy which, together with the horizontal and vertical ribs, will resist any tendency for the blade to break or split and curl back under impact.

Scraper blades have generally been made of uniform thickness, the thickness being increased to match the toughness of the work to be performed by the blade. Such blades become too costly and, with greater thickness put too much strain on their mounting on the mould board of the grader, thereby imposing a severe limit on the class of work that could be performed by any one machine. Further, blades of uniform thickness have little resistance to splitting and back curling under continuous impact conditions and through time, pieces of the blade break off, particularly at the ends of the blade.

The object of the invention is to provide a scraper blade for road graders which will have inherent high strength and light weight.

A further object of the invention is to provide a scraper blade having a reinforced cutting edge and a multiplicity of vertical cutting ribs supporting and reinforcing the cutting edge.

A further object of the invention is to provide a scraper blade having a multiplicity of cutting ribs each having large load displacement areas.

A further object of the invention is to provide a scraper blade having angled turbulence creating surfaces to cut and break-up the material displaced by the blade.

A further object of the invention is to provide a scraper blade having a reinforced, work hardening and self-sharpening cutting edge. These and other objects will be apparent from the following specification and the accompanying drawings, in which:

Fig. 1 is a perspective view of a grader mould board having a pair of scraper blades secured to its lower horizontal edge.

Fig. 2 is a plan view of a mould board with scraper blades showing how turbulence in the material being graded causes it to fracture and be broken up into relatively small pieces by the vertical ribs.

Fig. 3 is a front elevation of one length of a scraper blade.

Fig. 4 is a plan view of the scraper blade shown in Fig. 3.

Fig. 5 is an enlarged end view of a scraper blade.

Fig. 6 is an enlarged vertical section of the scraper blade shown in Fig. 5 and showing in chain-dot lines the lower edge of a grader mould board.

Fig. 7 is an enlarged horizontal section of a portion of a scraper blade taken on the line 7—7 of Fig. 3.

Fig. 8 is an enlarged, vertical section of the cutting edge of a scraper blade and showing in dotted lines the shape taken of its lower edge on continuous self-sharpening of the blade during working.

Referring to the drawings, the mould board 5 of a grading machine can be attached in any suitable manner to the machine for setting to any desired attitude to the work and angle to the direction of travel. One or more scraper blades 6 are secured end to end to the lower edge 7 of the mould board 5 by the bolts 8 and two such scraper blades are shown secured to the mould board in Figs. 1 and 2.

The scraper blades 6 are cast from manganese or similar work hardening alloy and are arcuate in shape corresponding to the curvature of the working face of the mould board 5. The front face of the scraper blades 6 has a horizontal rib 9 extending the full length of the lower horizontal edge of the blade, and a series of vertical ribs 10 at the vertical ends of the blade and at spaced intervals along its length. The ribs 9 and 10 separate a series of depressed surfaces 11 which are un-enclosed at the top horizontal edge 12 of the blade.

The rear face 13 of the scraper blades are cut back at 14 at an acute angle along the top and bottom horizontal edges. The upper cut back 14 allows the blade 6 to fit snug against the recessed lower edge of the mould board 5. The bottom cut back 14 forms a clearance area for the cutting edge 15 of the blade. The rib 9 therefore compensates for the metal cut away at 14 and strengthens the whole cutting edge of the blade to allow loose material behind the cutting edge to be cleared quickly away from the cutting edge in the same manner as in the clearance area behind the cutting edge of a drill. The lower cut away at 14 also brings the heel 14a of the blade forward so that when the blade is set at the scraping attitude relative to the road surface, the heel 14a will wear down quickly by self-sharpening along the dotted lines 22 shown in Fig. 8. The cutting edge 15 of the blade is further strengthened against back curling and splitting by the vertical ribs 10 tying in with the horizontal rib 9 at the surface 16.

The ribs 10 can be of any desired section so far as they contribute to the strength of the scraper blade but preferably have a section in the form of a trapezoid, the top surface 17 of which allows for the load displacement on the face of the ribs to be spread over a relatively large area. The sharp edges 18 of the ribs 9 and 10 each form a cutting edge tending to cut into and break up the material being displaced by the scraper blade 9, forcing the material in against the depressed surfaces 11. The end ribs 10a have their outer end surfaces formed at right angles to the length of the blade and are generally of the same section as the rib 9. The adjacent angled surfaces of the rib 9 and ribs 10 and 10a therefore form wedging surfaces which break into fracture and cause turbulence in the material being displaced and tend to crush the material horizontally between the vertical ribs while the body of material as a whole is being displaced horizontally in the direction of the arrow A generally parallel with the setting of the mould board in respect to the forward travel of the grading machine indicated by the arrow B as shown in Fig. 2. The end vertical ribs 10a together with the adjacent ribs 10b are preferably set closer together than the remainder of the vertical ribs in order to give added strength to the ends of the blades 6 as it is the ends of the blades 6 which tend to curl back first and then break off. The surface 16 of the rib 9 tends to cause the break-up of the material being displaced, therefore relieving the load on the rib 9 during the cutting operation.

The scraper blades are provided with a series of bolt-receiving apertures 19. These apertures are moulded with a square portion 20 and a tapered portion 21 to receive the square shoulder and tapered head of a plow bolt, not shown. The apertures 19 are located in the body of the blades 6 between the vertical ribs 10 so that the heads of the plow bolts are given the maximum of protection from the abrasive action of the material C being cut and displaced by the blade 5.

When a scraper blade or blades 6 of the type above described are secured to the lower edge of a mould board 5, the mould board is greatly strengthened itself. The horizontal rib 9 of the scraper blade provides a stiff cutting edge to the blade which, combined with the tough work hardening properties of manganese or such like alloys from which the blade is formed, resists any tendency for the blade to curl back, split or break off. Such tendency for the blade to curl back, split or break off is further resisted by the closely spaced vertical ribs 10, particularly by their jointure with the horizontal rib 9.

The fact that the ribs 9 and 10 also act as cutting edges tending to break up the material being displaced has the effect of lightening the load at any one point on the blades 6 while making it easier for the displaced material to be moved sideways by the mould board as a whole.

The provision of the rib 9 supported by the ribs 10 ensures an ample body of metal at the cutting edge of the blade which will stand up for a long period to the wear caused by the self-sharpening action on the cutting edge of the blade as indicated by the dotted lines 22 in Fig. 8. The rib 9 allows the clearance angle at 14 on the back of the blade to project higher for greater wear than would normally be possible in a blade of even thickness.

The formation of the horizontal and vertical ribs allows for considerable reduction in the weight of the scraper blades while providing more efficient displacement and turbulence of material by the blade particularly when the material is composed of rock and shale encountered at the level of the cutting edge of the blade.

What I claim is:

1. A cast scraper blade for road grading machines or the like, the said scraper blade having a horizontal rib on the lower horizontal edge of the working face of the blade and forming the cutting edge thereof, and a series of vertical ribs projecting upwardly from the said horizontal rib for the full height of the working face of the scraper blade.

2. A scraper blade for road grading machines or the like in which the scraper blade is cast of a work hardening alloy metal, the said scraper blade having a horizontal rib cast on the lower horizontal edge of the working face of the blade and forming the cutting edge thereof, and a series of vertical ribs projecting upwardly from the said horizontal rib for the full height of the working face of the scraper blade.

3. A scraper blade for road grading machines or the like in which the scraper blade is cast of a work hardening alloy metal, the said scraper blade having a horizontal rib cast on the lower horizontal edge of the working face of the blade and forming the cutting edge thereof, and a series of vertical ribs projecting upwardly from the said horizontal rib for the full height of the working face of the scraper blade, each of said horizontal and vertical ribs having flat face surfaces, the edges of which form individual cutting edges.

4. A scraper blade for road grading machines or the like as set forth in claim 3, in which the vertical ribs intermediate of the ends of the blade are of tapered section wider at the base and narrower at the top of the ribs.

5. A scraper blade for road grading machines or the like as set forth in claim 4, in which the inward facing edges of the horizontal rib and the outer vertical ribs are angled to correspond with the angled faces of the intermediate vertical ribs.

6. A scraper blade for road grading machines or the like in which the scraper blade is cast of a work hardening alloy metal and is arcuate in vertical end elevation, the said scraper blade having a horizontal rib cast on the lower horizontal edge of the working face of the blade and forming the cutting edge thereof, and a series of vertical ribs projecting upwardly from the said horizontal rib for the full height of the concave working face of the blade, the outer face of said horizontal and vertical ribs being of uniform height outwardly from the working face of the arcuate body of the scraper blade.

7. A scraper blade for road grading machines or the like as set forth in claim 6, in which the lower horizontal edge of the rear surface of the blade is cut back at an acute angle to form a clearance area behind the cutting edge of the blade.

8. A cast scraper blade for road grading machines or the like, the said scraper blade having a horizontal rib on the lower edge of the working face of the blade, the said horizontal rib being of reduced thickness at its lower edge to form a self sharpening heel to the blade when the blade is set at a scraping angle with respect to the road and a series of vertical ribs on the forward face of the blade projecting upwardly from the said horizontal rib.

References Cited in the file of this patent

UNITED STATES PATENTS

| | | |
|---|---|---|
| 1,765,218 | Erhart | June 17, 1930 |
| 1,922,917 | Russell et al. | Aug. 15, 1933 |
| 2,257,761 | Paulsen | Oct. 7, 1941 |
| 2,633,164 | Kissner et al. | Mar. 31, 1953 |